US 6,688,682 B2

(12) United States Patent
Arthur et al.

(10) Patent No.: US 6,688,682 B2
(45) Date of Patent: Feb. 10, 2004

(54) WINDOW PANEL AND ROOF VISOR SYSTEM FOR A UTILITY VEHICLE

(75) Inventors: John Raymond Arthur, Grovetown, GA (US); Russell William Strong, Grovetown, GA (US); Michael Robert Ondayko, Grovetown, GA (US); Daniel James Knight, Grovetown, GA (US); Robert Orval Hartweg, Grovetown, GA (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 09/945,556

(22) Filed: Aug. 29, 2001

(65) Prior Publication Data

US 2003/0042765 A1 Mar. 6, 2003

(51) Int. Cl.[7] ................................ B60J 7/08; B60J 7/19
(52) U.S. Cl. ........................ 296/216.02; 296/216.03; 296/224; 49/67
(58) Field of Search ..................... 296/215, 216.02, 296/216.03, 224; 19/62, 67

(56) References Cited

U.S. PATENT DOCUMENTS

| | | | | |
|---|---|---|---|---|
| 2,215,022 A | * | 9/1940 | Votypka | ............ 296/215 |
| 4,121,380 A | * | 10/1978 | Lockshin | ............ 49/67 |
| 4,415,197 A | | 11/1983 | Meyer | |
| 6,062,637 A | | 5/2000 | Hoffman | |
| 6,073,995 A | * | 6/2000 | Klein | ............ 296/216.02 |

OTHER PUBLICATIONS

Deutz Fahr Brochure "Agroplus" (3 pages).
Die Kompakten von Renault "Pales" (3 pages).

* cited by examiner

Primary Examiner—Dennis H. Pedder
(74) Attorney, Agent, or Firm—Polit & Erickson, LLC (57) ABSTRACT

A visor and transparent window assembly for a utility vehicle cab roof includes a latch mechanism which is selectively operable to retain the transparent panel closed to the roof or to tilt the transparent panel upwardly. The visor overlying the transparent panel is engageable by the latch mechanism to hold the visor to the transparent paneling in close overlying relationship. Plural gas struts are connected between the visor and the utility vehicle roof to assist in the tilting open of the visor. The visor and the transparent panel are hingedly connected to the roof along a common axis so that the transparent panel and the visor can be opened together as a unit without binding. The latch mechanism includes a hook end which can selectively engage the visor to the transparent panel such that the visor and the transparent panel are latched closed to the roof together or can be pivoted together to an open position.

30 Claims, 13 Drawing Sheets

WINDOW PANEL AND ROOF VISOR SYSTEM FOR A UTILITY VEHICLE

TECHNICAL FIELD OF THE INVENTION

The present invention relates to roof window panel and visor structures for utility vehicles. Particularly, the invention relates to a tractor cab roof having a selective multi-position visor in combination with an overhead multi-position window panel.

BACKGROUND OF THE INVENTION

Enclosed operator stations or "cabs" for utility vehicles, having an overhead multi-position transparent window panel are known. Typically, the window panel allows the operator to observe vehicle functions such as elevated loader or hoisting operations. Additionally, the window panel can be partially opened or removed to provide improved cab ventilation. Some known cabs provide an open hole in the cab roof, covered by an opaque panel. The opaque panel is hinged, providing a two-position protective covering. The panel is hinged on a side toward a front of the cab and opens toward the rear of the cab, offering no overhead viewing for loader operations.

Cabs equipped with overhead transparent window panels have increased sun loads placed within the operator station. Additionally, an open or partially opened window panel affords little or no protection to the operator while operating in adverse conditions, e.g. cold, rain, snow.

The present inventors have recognized the desirability to provide an operator station or cab having a roof with a window opening, covered by a transparent window panel and protected by an openable hinged roof panel for maximum roof utility and operator comfort. The present inventors have recognized the desirability to provide a roof window system that allows operator viewing of front overhead operations.

SUMMARY OF THE INVENTION

The present invention provides a multi-position hinged roof panel or "visor" and a multi-position window panel beneath the multi-position roof panel. Advantageously, as viewed from the operator's seat, the overhead window panel is placed in an opening in a cab roof coinciding with the line-of-sight of a raised loader bucket. The hinged roof panel overlies the window panel. The window panel shares a common hinge axis with the hinged roof panel. The common axis allows the window panel to function dependently or independently of the visor, providing the operator with a choice of various options.

An operable, multi-position latch, accessible from within the cab, integrates the visor and the panel into a single entity for movement, when the latch is placed in one position. When the latch is placed in another position, the latch allows the window panel to partially open or close independently of the visor. For example, in weather situations such as rain, the operator can unlatch the window panel from the visor, and using the latch selectively, can position the window panel for optimum protection and/or ventilation.

The visor is supported by gas struts to facilitate rotation about the hinge axis while limiting a maximum open position of the visor. The visor serves as a shield with respect to the window panel. When closed, the visor provides maximum weather protection to the operator. When the visor is open, an extruded raised gutter around the perimeter of the window opening provides weather protection to the operator. If the operator desires to have a completely open roof panel, the latch is rotated to a position which latches the window panel with the visor. The struts assist with opening the window panel to a full visor opened position. Depending on the position of the utility vehicle, even when raised the visor provides protection from the sun and some protection from precipitation.

An alternate embodiment of the visor provides lights along the front face. If operating the raised loader in an environment void of adequate lighting, the visor can be released to direct lighting toward the operation at hand.

The present invention provides an aesthetically pleasing visor which blends with the vehicle cab roof. The invention provides the operator with various selectable positions of the visor and the window panel, selectable for maximum operator comfort. The present invention minimizes sun load within the operator's station. The visor of the invention provides some protective cover for open roof/open window panel while operating in adverse weather conditions. The visor allows a manual operation for reduced cost compared to power roofs. The visor can also be equipped to provide directional lighting for overhead operation.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
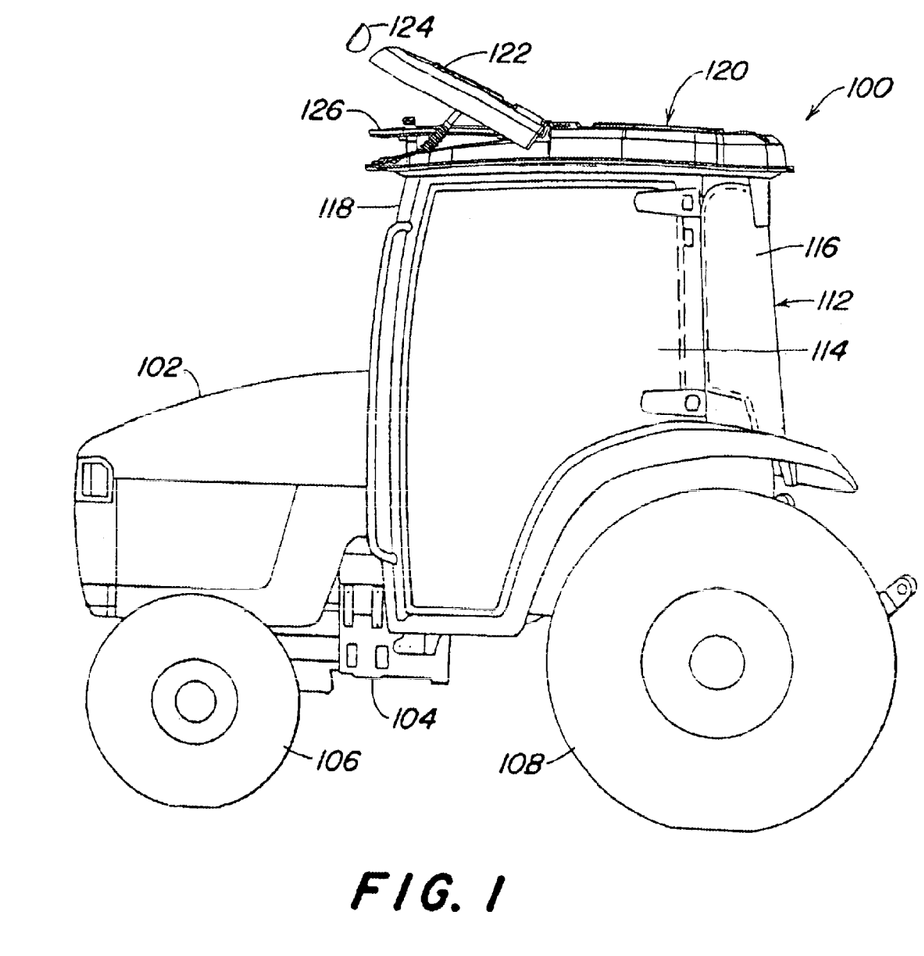
FIG. 1 is an elevational view of a tractor incorporating a roof visor and window panel system of the present invention.

FIG. 1 illustrates a utility vehicle 100, such as a tractor, that includes a hood 102 covering the engine (not shown) of the tractor 100, and a chassis or frame 104 supported on front wheels 106 and larger rear wheels 108. A cab 112 is supported on the chassis and is substantially enclosed by glass panels 114, 116 on a facing side of the tractor and similar panels (not shown) on an opposite side of the tractor, and a wind screen 118 on a front side of the cab 112. A roof 120 closes a top of the cab. An openable roof panel or visor 122 is shown in a tilted-open position. The visor can provide lights 124 along the front face. If operating the raised loader in an environment void of adequate lighting, the visor can be released to direct lighting toward the operation at hand. A transparent window panel 126 is arranged below the visor 122 and is shown in a tilted-open orientation.

Figure 2:
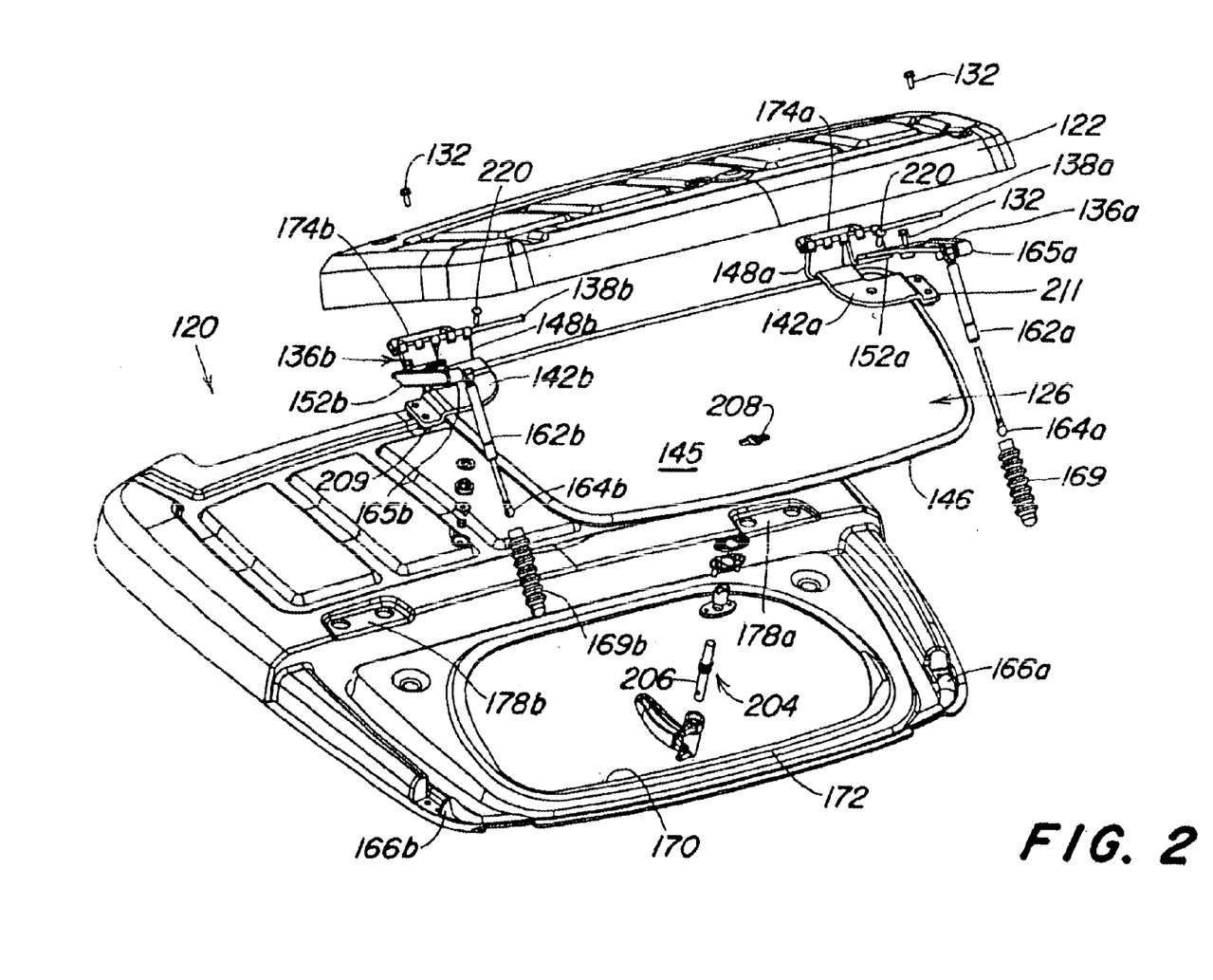
FIG. 2 is an exploded top perspective view of the roof of the tractor shown in FIG. 1.
Figure 3:
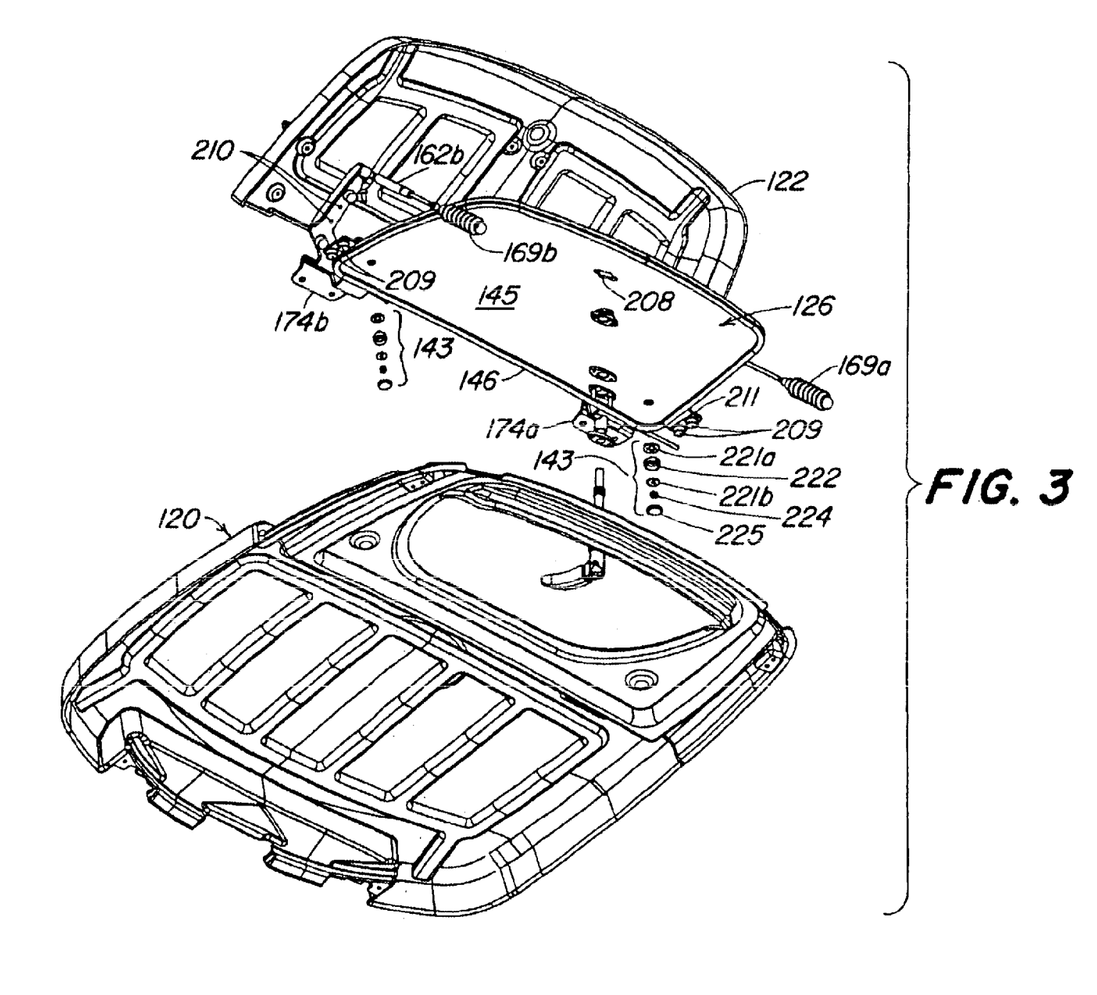
FIG. 3 is an exploded bottom perspective view of the system shown in FIG. 2.
Figure 4:
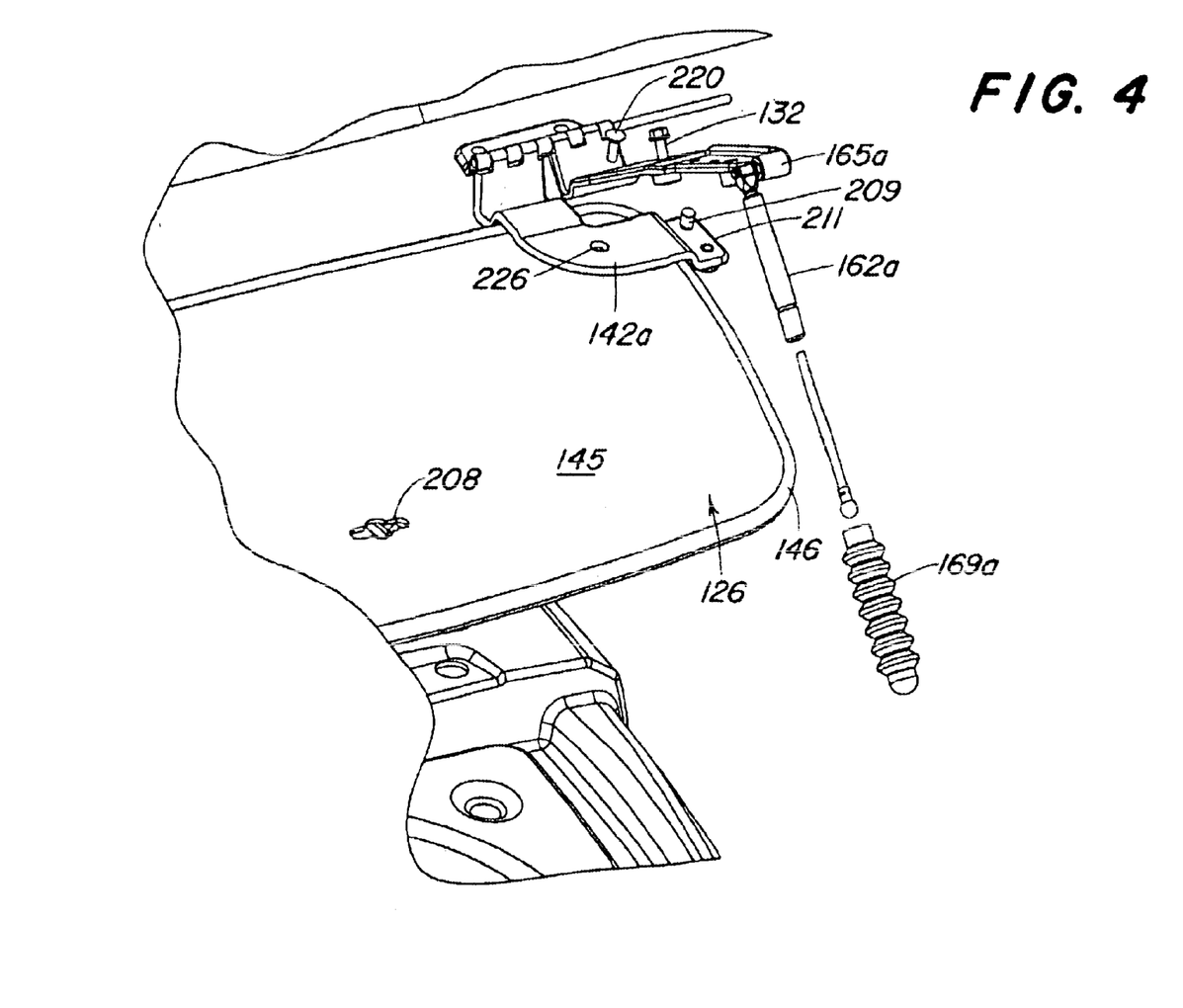
FIG. 4 is an exploded fragmentary perspective view of the system shown in FIG. 2.

FIGS. 2–4 illustrate the roof 120 in exploded fashion. The visor 122 is attached via screws 132 to hinges 136a, 136b located on opposite ends of the visor 122. The hinges 136a, 136b are substantially L-shaped and are pivoted on a hinge pins 138a, 138b. The window panel 126 is mounted to shaped hinges 142a, 142b via fastener assemblies 143 described below, and shown in FIG. 3. The hinges 142a, 142b are shaped in mirror-image fashion. The window panel 126 includes a transparent glass or plastic pane 145 surrounded by a seal 146, such as a rubber seal.

The shaped hinges 142a, 142b include an end-leg 148 which is pivotally carried by the respective hinge pins 138a, 138b. Thus, both the visor 122 and the window panel 126 are pivoted about the-same hinge pins 138a, 138b. The visor 122 and the window panel 126 can thus pivot together or pivot separately about the same axis.

Figure 13:
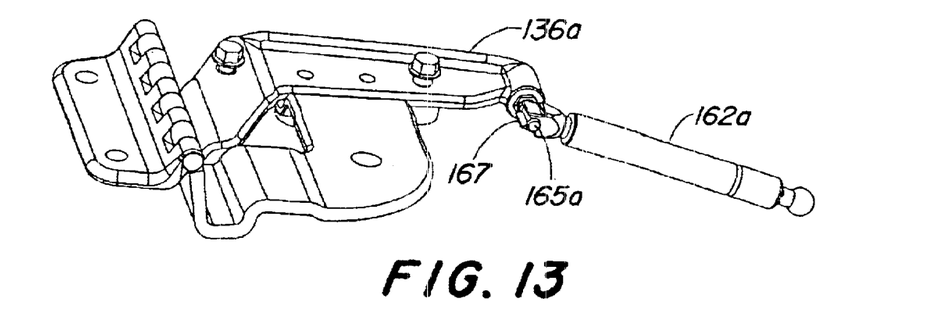
FIG. 13 is an enlarged fragmentary side view of a strut connected to the visor.

Elongated legs 152a, 152b of the L-shaped hinges 136a, 136b include studs 165a, 165b (shown in FIG. 4) for receiving clip-on style ends of gas struts 162a, 162b, respectively. A typical clip-on style end 167, clipped to a stud 165a, is shown in FIG. 13. The end 167 is C-shaped to releasably grip the stud and allow rotation of the end on the stud. Opposite ball joint ends 164a, 164b of the gas struts are fit into sockets 166a, 166b of the roof 120 adjacent a framed opening 170 of the roof 120. Rubber boots 169a, 169b fit over the struts 162a, 162b to provide some weather protection. A surrounding sealing surface 172 is provided to mate with the seal 146 on the window panel 126 when in a closed position.

The hinge pins 138a, 138b are mounted to hinge bases 174a, 174b which are attached by screws to recessed landings 178a, 178b, respectively formed in the roof 120.

A multi-position latch assembly 204 is provided. The latch assembly includes a shaft 206 which penetrates through components of the assembly and also through an aperture 208 of the window panel 126. The latch assembly is shown and described more completely in FIG. 5.

Fasteners 209 are received in apertures of outwardly extending tabs 211 of each of the hinges 142a, 142b and have extra length such that the fasteners 209 can extend to be threadedly engaged into aligned holes 210 in the elongated leg 152a, 152b of the visor hinges 136a, 136b, to couple the window hinges 142a, 142b to the visor hinges 136a, 136b. If this is done, and the visor 122 is removed, the gas struts 162a, 162b connected to the visor hinges 136a, 136b, can be used to assist the raising of the window panel 126 rather than assisting the raising of the visor 122.

The window panel 126 is attached to the shaped hinges 142a, 142b by fastener assemblies 143. Each assembly 143 includes a fastener 220 (FIG. 2) and plural stacked components such as washers 221a, 221b, a gasket 222, a nut 224 and a plastic cap 225 for covering the nut 224 (FIG. 3). Washers 221a, 221b are placed on opposite sides of the pane 145. The gasket 222 is placed directly below the top washer 221a on top of the pane 145. The fastener 220 penetrates a hole 226 through each respective hinge 142a, 142b, and a hole in the pane 145 and the washers 221a, 221b, and the gasket 222. The fastener 220 is threaded into the nut 224. The nut 224 is tightened and covered with the plastic cap 225. The window panel 126 is thus securely fastened to the respective hinges 142a, 142b.

Figure 5:
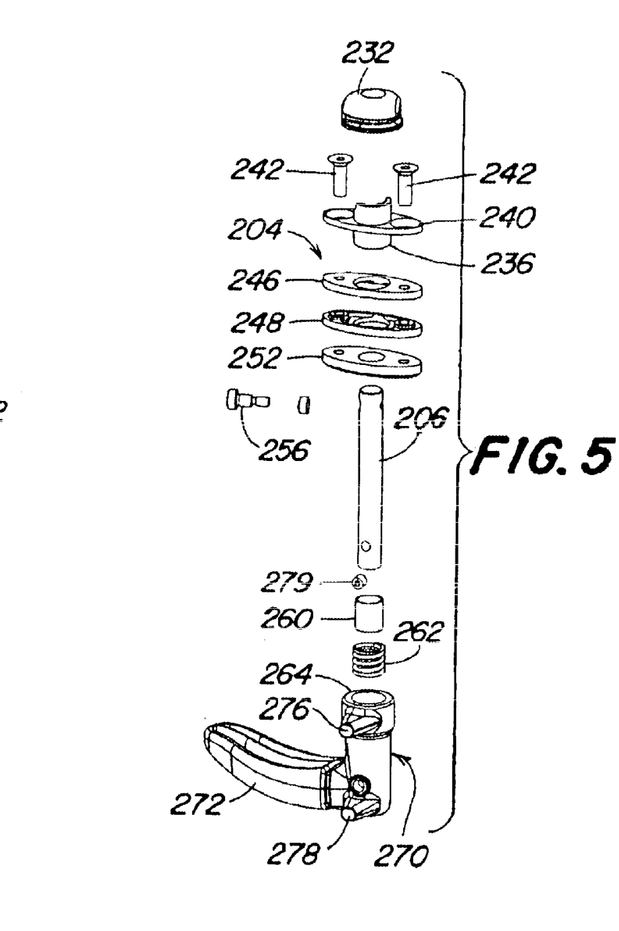
FIG. 5 is an exploded perspective view of a multi-position latch mechanism of the system shown in FIG. 2.
Figure 10A:
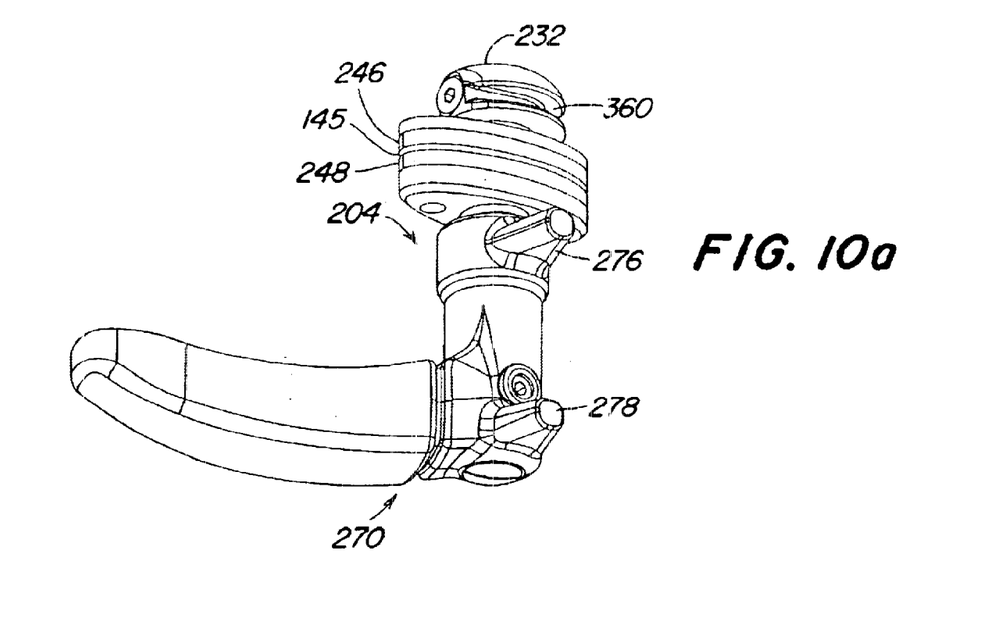
FIG. 10A is an enlarged perspective view of the latch assembly shown in the system of FIG. 2.

FIGS. 5 and 10A illustrate the latch assembly 204. The assembly includes a top hook member 232 mounted on the shaft 206. The shaft 206 fits through a bearing 260 inside a collar 236 which is fixed to a flange 240. The flange 240 includes fastener holes for receiving two fasteners 242. A seal 246 and a seal 248 are located on a top and bottom side of the window panel 126 respectively. Below the glass window panel 126 is a bottom flange 252 which receives the threaded fasteners 242 into threaded holes to tightly clamp the parts 240, 246, 248, 252 onto the glass window panel 126. The assembly includes a bolt 256 which fixes the hook member 232 to the shaft 206. The shaft 206 is received within the bearing 260 which is spring loaded upwardly by a coil spring 262 which resides within a hub 264 of a latch lever 270. The latch lever 270 includes a handle 272, an upper latch 276 and lower latch 278. The handle 272 is fixed to the shaft 234 by a set screw 279.

Figure 6:
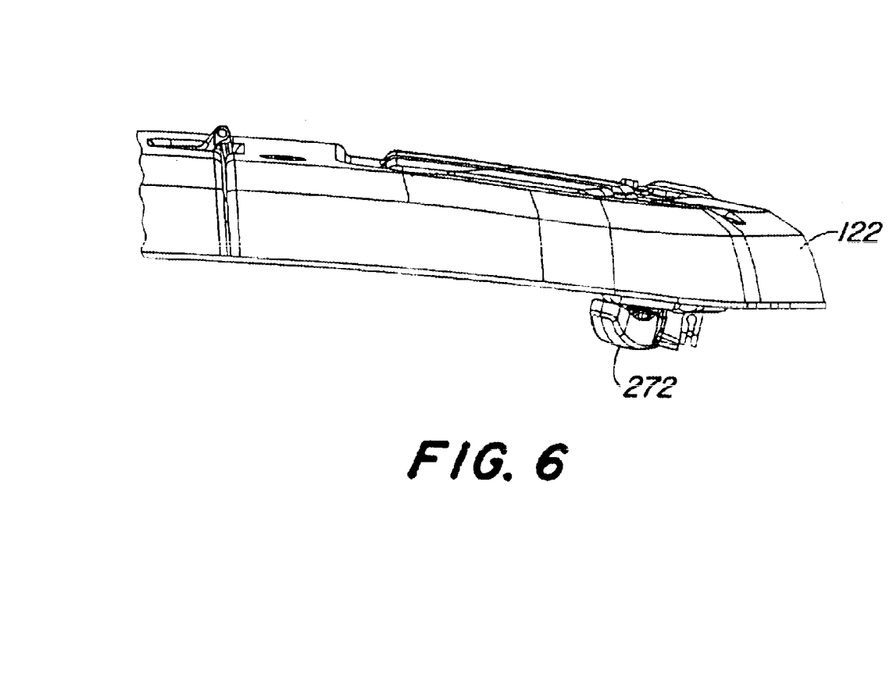
FIG. 6 is a perspective fragmentary view of the system of FIG. 2 shown in a visor closed and window panel closed position.

FIG. 6 illustrates the visor 122 and window panel 126 pivoted downwardly in a closed condition.

Figure 7:
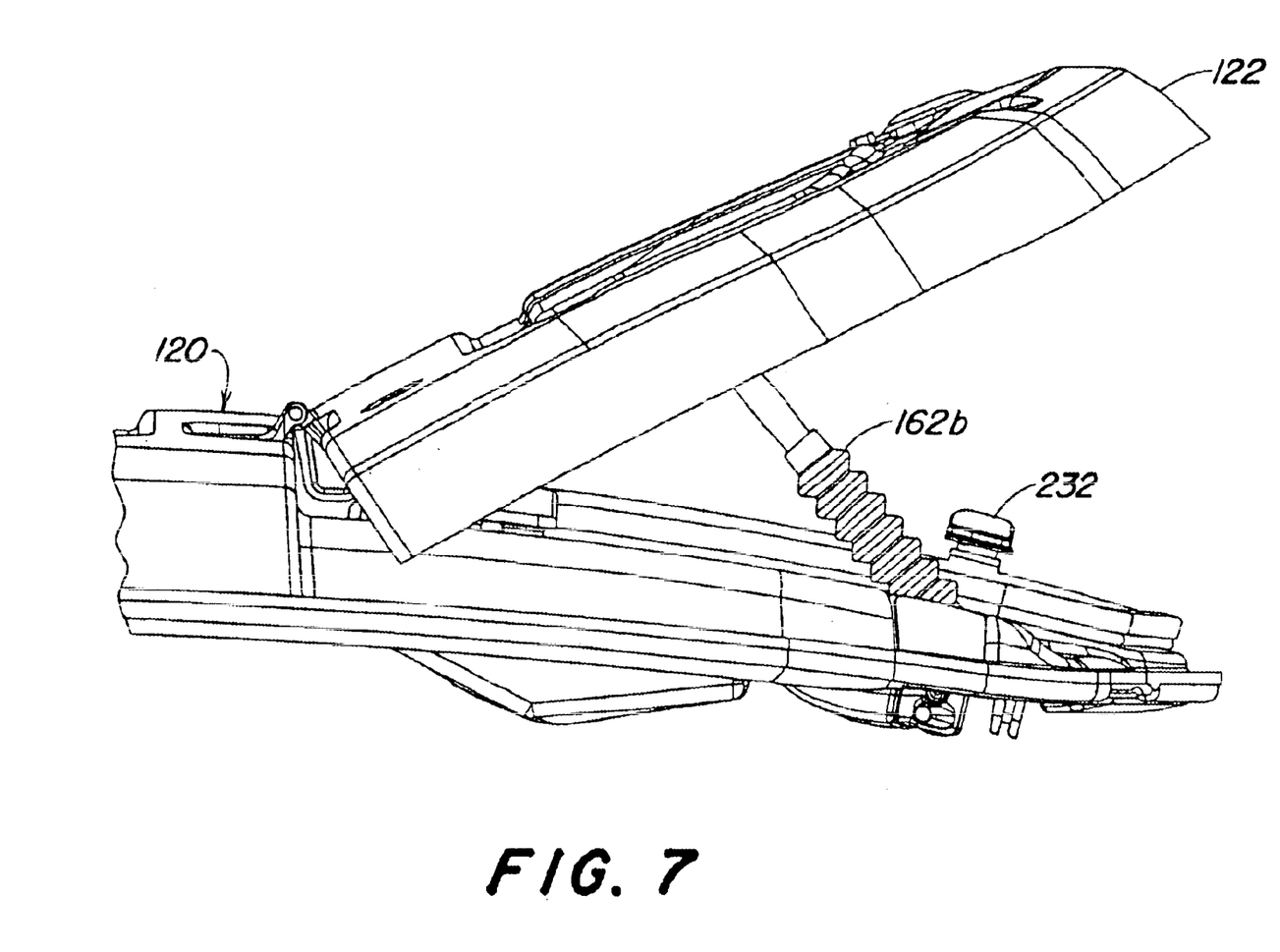
FIG. 7 is a perspective view of the system shown in FIG. 2, shown in a visor partially open and window panel closed orientation.

FIG. 7 shows the visor 122 pivoted upwardly, with assist from the gas struts 162a (not shown) and 162b. The hook member 232 is shown disengaged from the visor 122.

Figure 8:
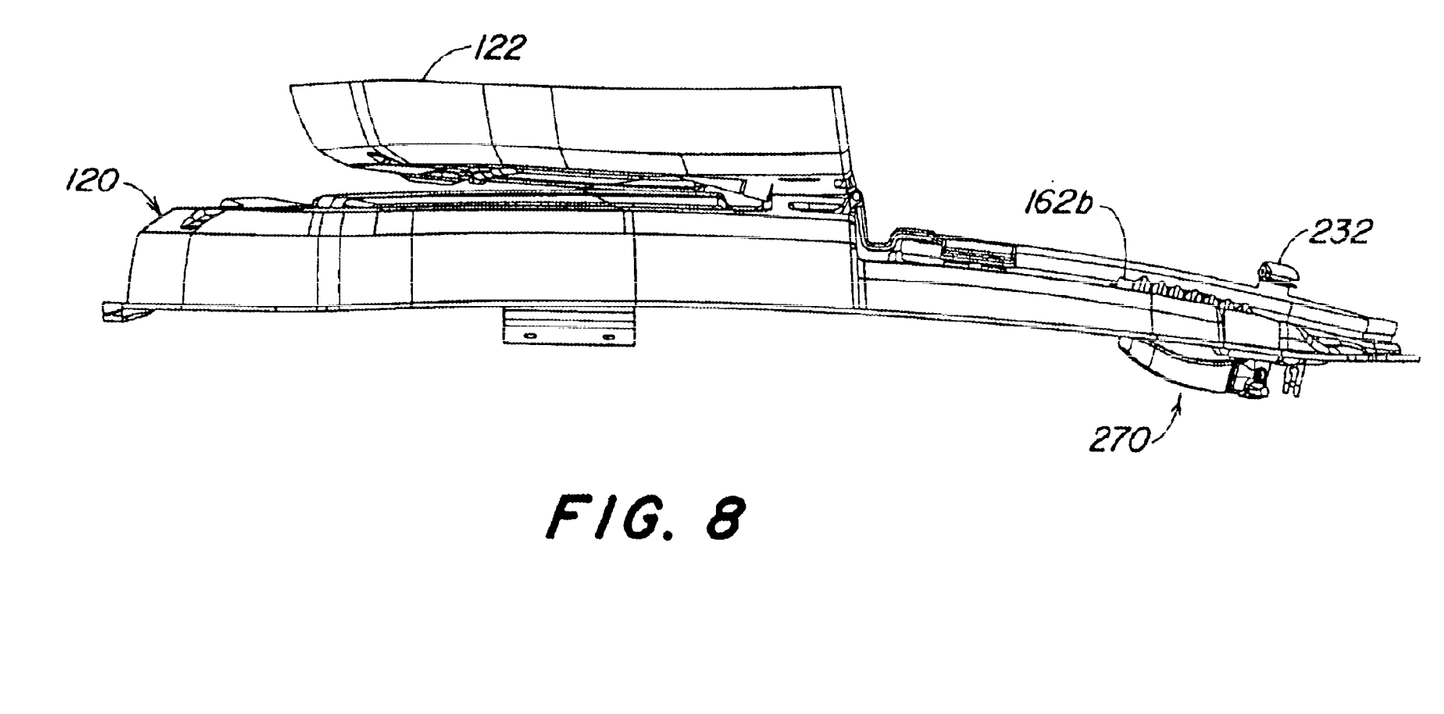
FIG. 8 illustrates the system in FIG. 2 shown in a visor completely open, window panel closed orientation.

FIG. 8 illustrates the visor 122 tilted a complete 180° from its closed configuration to a completely open configuration shown. The struts 162a, 162b are disconnected from the studs 165a, 165b and are laid flat on the roof 120. The clip-on style ends 167 of the struts 162a, 162b and the studs 165a, 165b are designed to separate if sufficient force in a backward direction is exerted on the visor 122. This prevents damage to the roof or visor if the visor strikes an overhead object.

Figure 9:
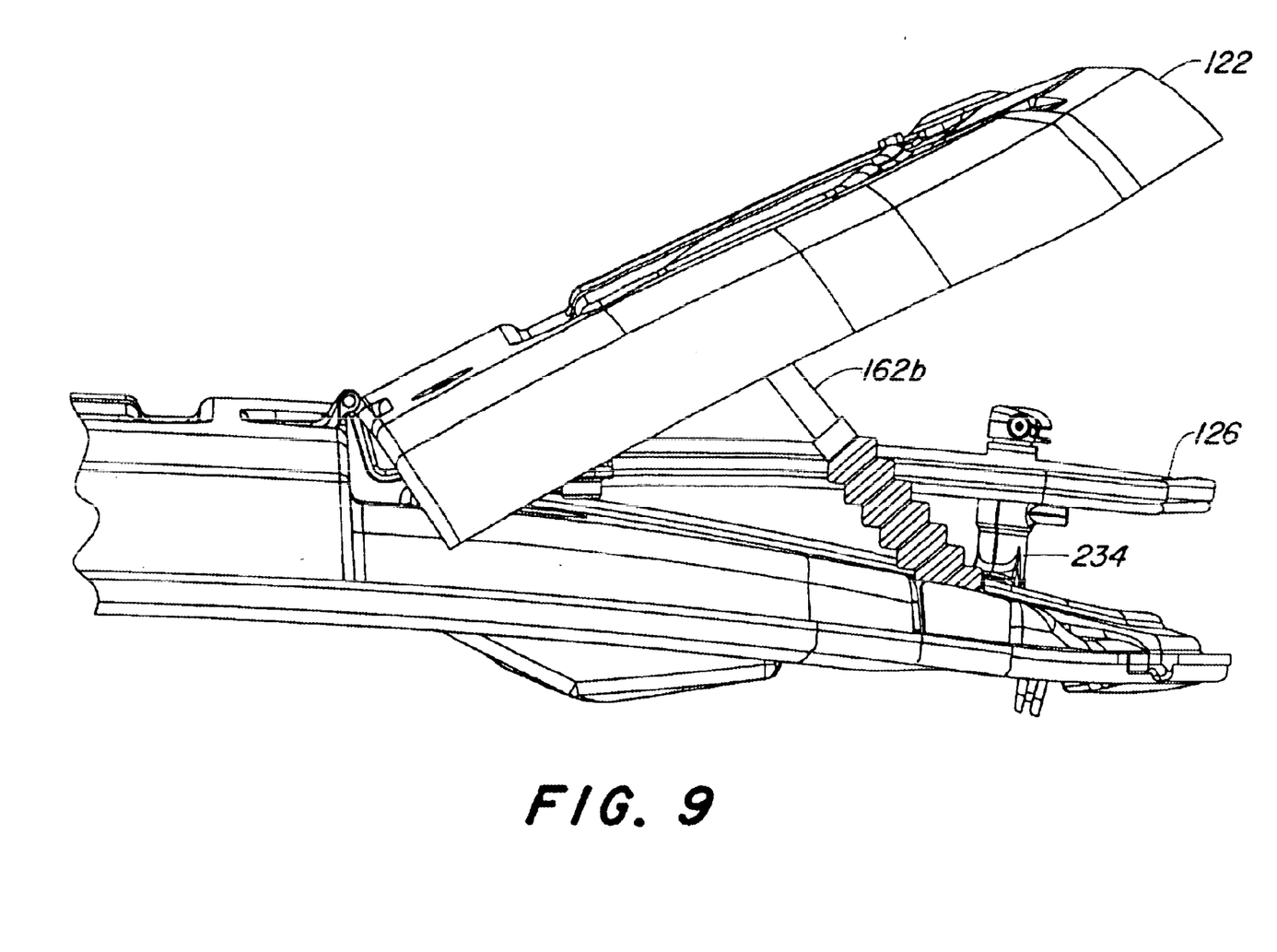
FIG. 9 is a perspective view of the system of FIG. 2 shown in a visor partially open, window panel partially open orientation.

FIG. 9 illustrates the visor 122 tilted upwardly at approximately a 45° angle, and held upwardly by the gas struts 162a, 162b. The window panel 126 is held titled upwardly by approximately 20°, held upwardly by the latch 278 (not shown).

Figure 10B:
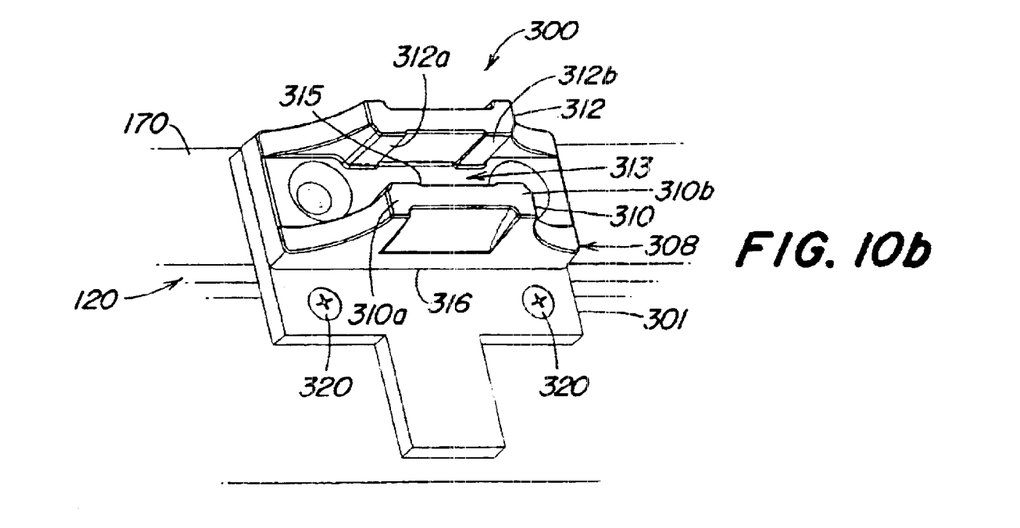
FIG. 10B is an enlarged perspective view of a catch assembly to be used to engage the latch assembly of FIG. 10A.

FIGS. 10A and 10B illustrate the latch assembly 204 and a corresponding catch assembly 300. The catch assembly 300 includes a mounting plate 301 that is mounted to the roof 120 adjacent the opening 170. The mounting plate 301 is vertically oriented and carries a latch part 308 having horizontally extending, shallow H-shaped shelves 310, 312. The mounting place 301 is attached to the roof 120 via sheet metal screws 320. A groove 313 defined between the shelves 310, 312 can receive either the upper latch 276, or the lower latch 278 depending the position desired for the window panel 126. The shallow H-shaped shelves 310, 312 provide a detent position 315 between the legs 310a, 310b, 312a, 312b of the shelves for holding either of the latches 276, 278 between the shelves 310, 312. The latch part 308 is preferably a unitary plastic part having a base 316 which is fastened via two screws through threaded holes in the mounting plate 301. Thus, the upper latch 276, when engaged in the slot between the shelves 310, 312 tightly closes or battens down the window panel 126 to the roof 120 as shown in FIG. 7. If the lower latch 278 is placed between the shelves 310, 312, the window panel 126 is held elevated, tilted upwardly as shown in FIG. 9.

Figure 11:
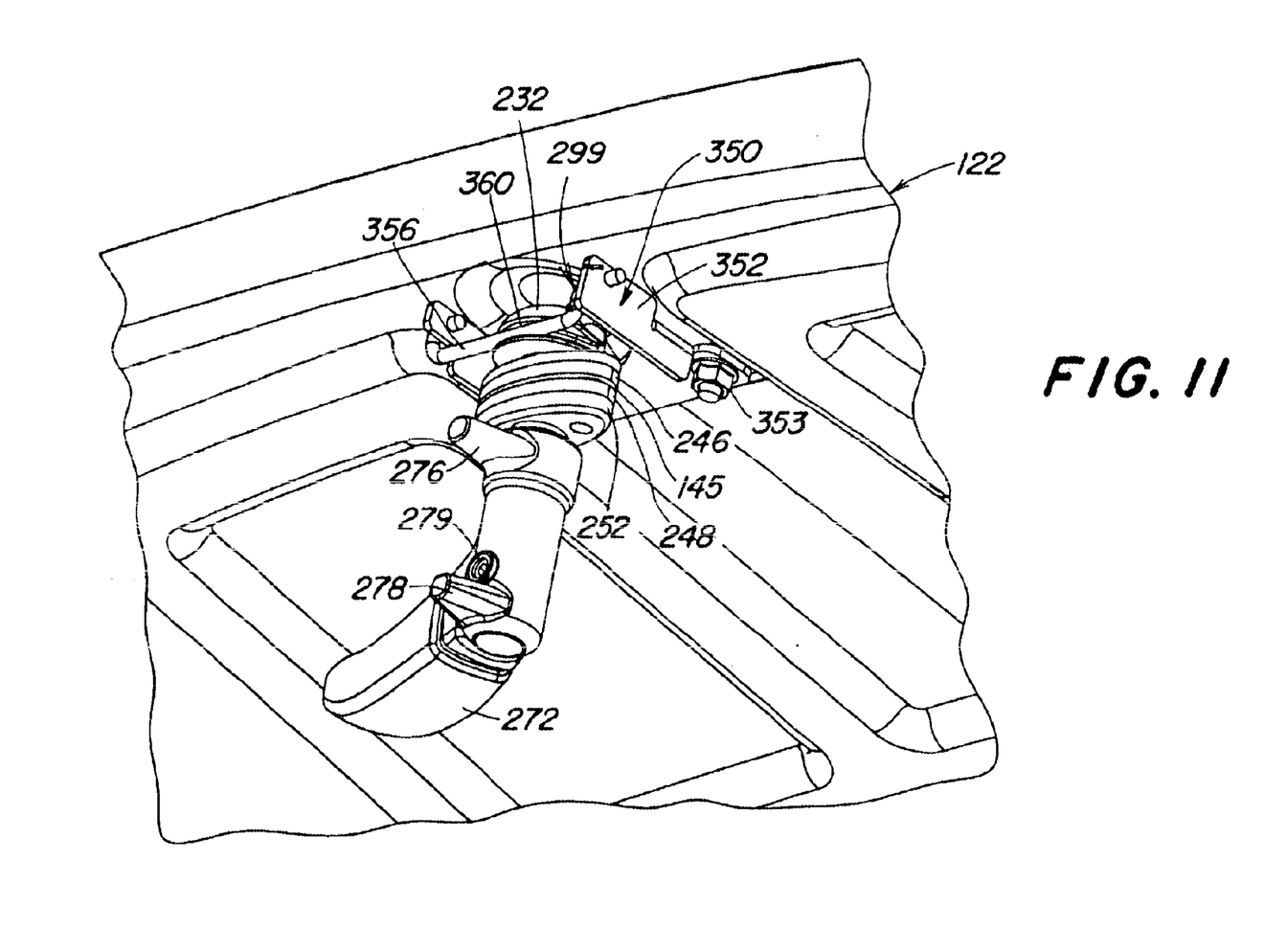
FIG. 11 is an enlarged fragmentary perspective view of the latch assembly of FIG. 10A with the window panel and the visor latched together and open.

FIG. 11 illustrates the latch assembly 204 wherein the hook member 232 is turned to engage a bracket 350 mounted to the visor 122. The window panel 126 is not shown for clarity but the pane 145 is partially shown between the seals 246, 248. The bracket includes a frame 352 bolted via fasteners 353 to the visor 122 and supporting a cross rod 356. Cross rod 356 is spring loaded by a torsion spring 299 (shown in FIGS. 14A–15B) to allow engagement of the cross rod 356 into a slot 360 of the hook member 232. The hook member 232 can be rotated to disengage the cross rod 356. In the position shown in FIG. 11, both the visor 122 and the window panel 126 are raised. The latch assembly 204 is carried upwardly by the struts 162a, 162b to be suspended on the window panel 126.

Figure 12:
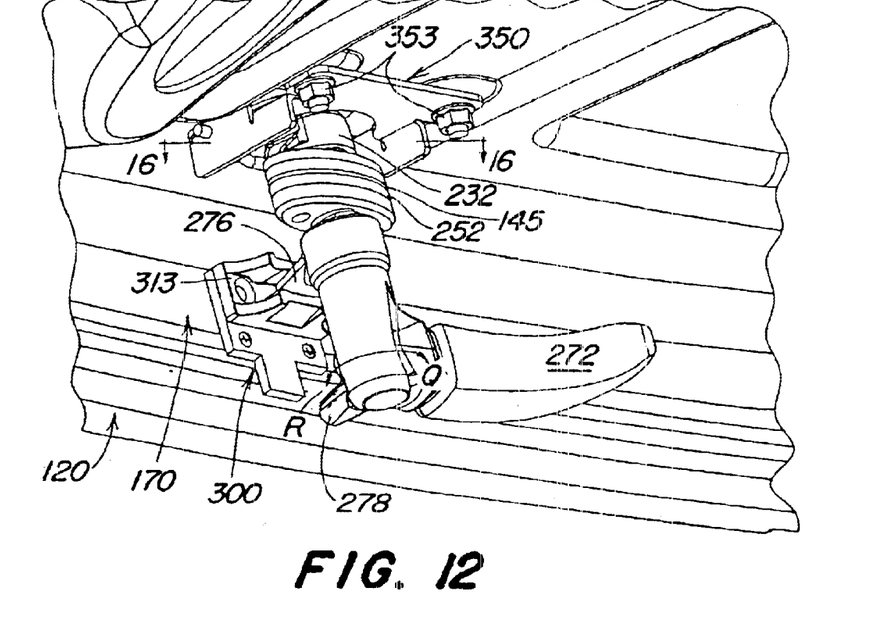
FIG. 12 is an enlarged fragmentary perspective view of the window panel and the visor latched together and closed to the roof.

FIG. 12 illustrates the latch assembly 204 in an orientation with the visor 122 engaged by the hook member 232 and the upper latch 276 engaged into the groove 313 of the bracket 300. The window panel 126 (not shown for clarity) and the visor are securely closed to the roof 120 over the opening 170. If the handle is pivoted a limited amount in the rotary direction R, the upper latch 276 can be removed from the slot 313, the handle 272 can be raised, with assist from the struts 162a, 162b, and the lower latch 278 can be inserted into the slot 313 by reverse rotation in the direction Q. The visor 122 and window panel 126 can thus be held in a tilted open position.

A rotation from the orientation shown in the direction R by more than the limited amount will not only disengage the latch 276 from the slot 313 but will disengage the hook member 232 from the cross rod 356 of the visor 122. The window panel can then be operated independently from the visor 122. The released visor 126 assumes a tilted open orientation under force from the struts 162a, 162b.

Figure 14A:
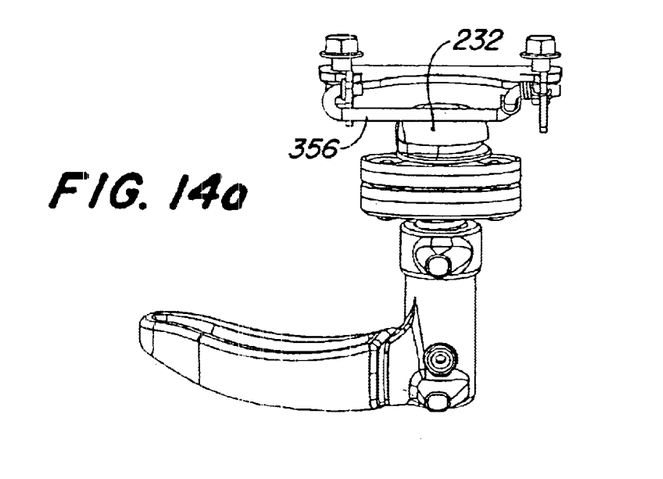
FIGS. 14A–14C illustrate the progressive engagement of the latch assembly of FIG. 10A with the visor.
Figure 14B:
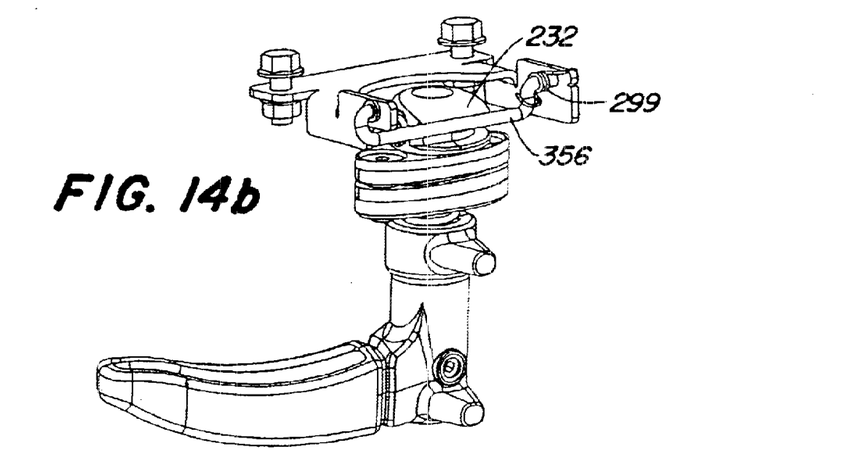
Figure 14C:
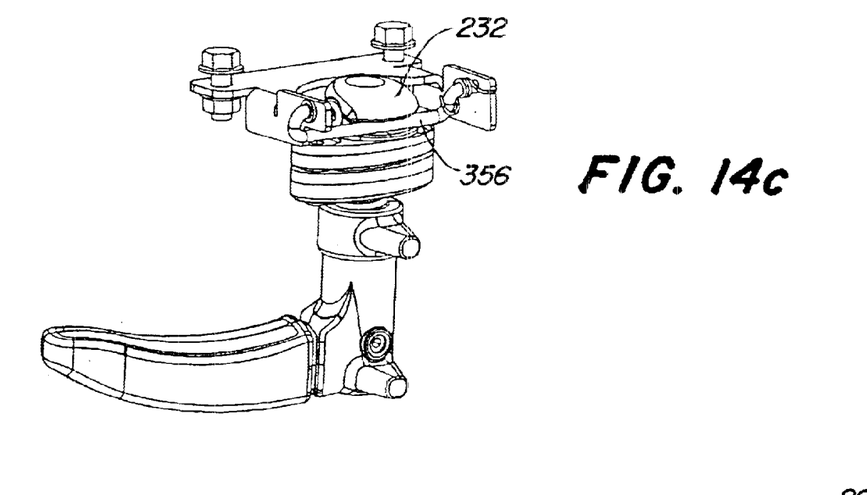

FIG. 14A–14C illustrate the progressive engagement of the hook end 232 with the cross rod 356. The cross rod 356 is pivotable about a line between its opposite ends in the frame 352. The cross rod 356 is urged to pivot downwardly by the spring 299 (FIG. 14A). The hook end 232 has a rounded head which contacts the cross rod 356 and forcibly urges the cross rod 356 to pivot upwardly (FIG. 14B) until the cross rod slips into the groove 360 by pivoting downwardly, urged by the spring 299 (FIG. 14C). The hook member 232 cannot elevate further to become disengaged due to the overhead interference with the visor 120.

Figures 15A, 15B:
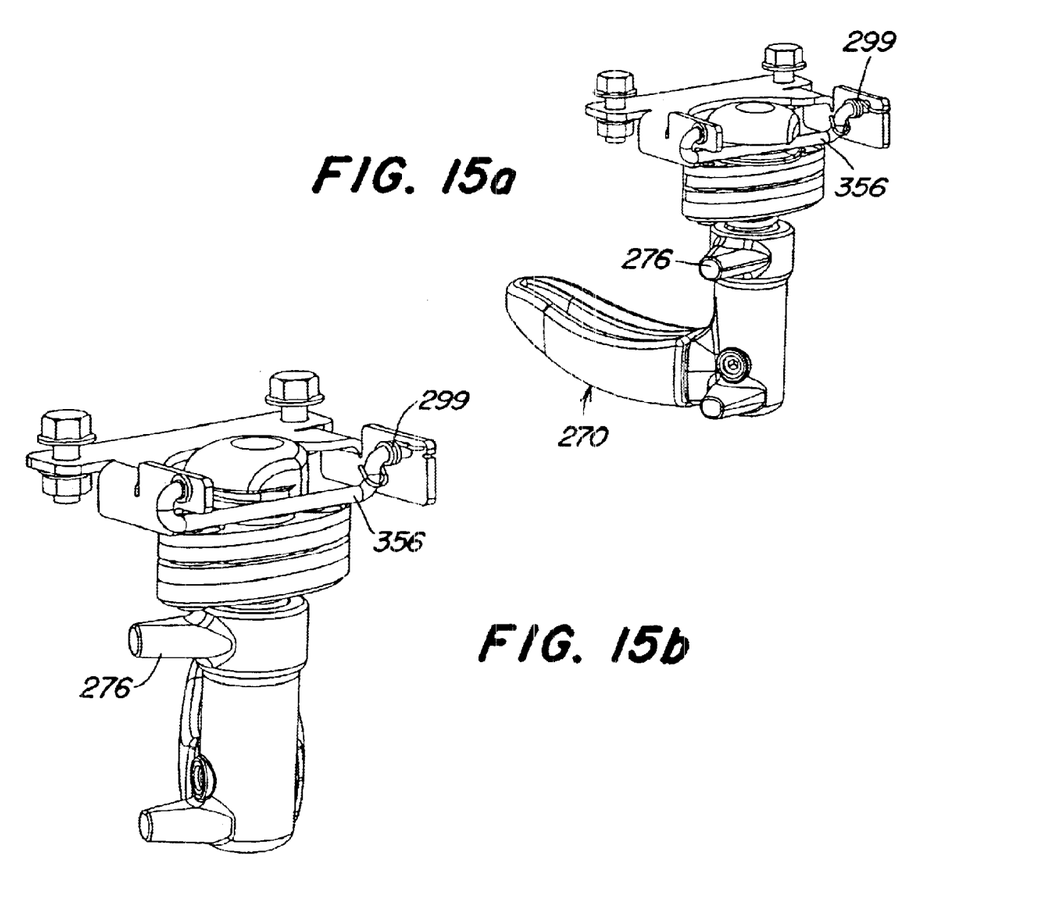
FIGS. 15A–15B illustrate the disengagement of the latch assembly form the visor.

FIGS. 15A and 15B illustrate the disengagement of the hook end 232 from the cross rod 356. In FIG. 15A, the latch 276 is in an orientation to be disengaged from the groove 313 of the catch assembly 300. The window panel 126 and the visor 122 can be lifted together. In FIG. 15B, the latch 270 has been further rotated and the hook end 232 disengages from the cross rod 356. The visor 122 separates from the window panel 126.

Figure 16:
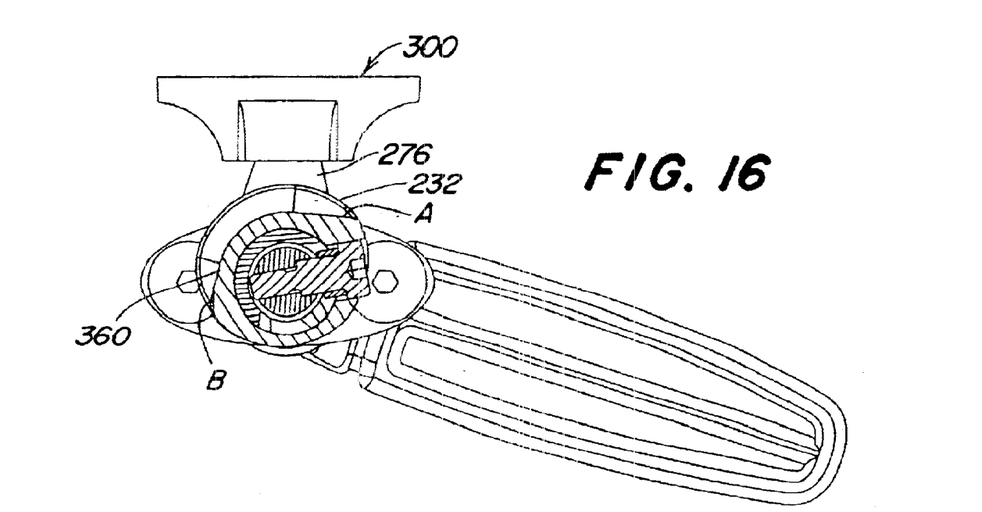
FIG. 16 is a sectional view taken generally along line 16—16 of FIG. 12 with the visor bracket not shown for clarity.

FIG. 16 illustrates the groove 360 extending around the hook end 232 from point A to point B.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A multi-position visor and window assembly for a utility vehicle, comprising:

a roof having a window opening:

a transparent panel adapted to cover said opening and pivotable on a backside thereof to a tilted open position;

an opaque visor overlying said transparent panel and hingedly attached to said roof;

wherein said transparent panel and said visor are hinged on a common hinge axis.

2. The system according to claim 1, comprising at least one gas strut connected between said visor and said roof to assist the pivoting open of said visor.

3. The system according to claim 1, comprising at least one visor hinge and at least one transparent panel hinge being arranged in overlapping fashion such that a fastener can be used to attach said hinges together to cause said hinges to rotate together.

4. The system according to claim 1, comprising a latch mechanism, said latch mechanism includes interlocking members carried by said transparent panel and the roof, said interlocking members capable of locking said transparent panel in a tilted open position or in a fully closed position.

5. The system according to claim 4, wherein said latch mechanism comprises a latch handle connected to a substantially vertical latch shaft, and first and second latches extending radially from said latch shaft, and at least one groove carried by said roof, said groove for receiving a selected one of the latches depending on the selected open tilt angle of the transparent panel.

6. The system according to claim 5, wherein said latch mechanism further includes a latch hook member on a distal end of said shaft, said hook member configured to engage said visor.

7. The system according to claim 6, wherein said latch mechanism includes a position corresponding to engagement of said hook member to said visor, a position corresponding to said first latch being engaged into said groove, corresponding to a position wherein said transparent panel covers said opening, and a position wherein said second latch is engaged into said groove corresponding to a position wherein said transparent panel is tilted open.

8. The system according to claim 1, wherein said transparent panel and said visor are hinged to said roof on said common hinge axis, and said visor is sized to cover said transparent panel when said visor and said transparent panel are closed onto said roof to cover said opening.

9. A visor and window assembly for a utility vehicle, comprising:

a roof having a window opening;

a transparent panel adapted to cover said opening, said transparent panel hingedly attached to said roof to be pivotable to an open position: and an opaque visor overlying said transparent panel and hingedly attached to said roof to be pivotable to an open position.

10. The system according to claim 9, further comprising a latch mechanism carried by said transparent panel, said latch mechanism configured to selectively latch said visor to said transparent panel.

11. The system according to claim 10, wherein said visor comprises a bracket and said latch mechanism includes a latch handle connected to a substantially vertical latch shaft, and a latch hook member on a distal end of said shaft, said hook member configured to engage said bracket.

12. The system according to claim 9, comprising at least one gas strut connected between said visor and said roof to assist the pivoting open of said visor.

13. The system according to claim 9, comprising at least one visor hinge and at least one transparent panel hinge being arranged in overlapping fashion such that a fastener can be used to attach said hinges together to cause said hinges to rotate together.

14. The system according to claim 9, comprising a latch mechanism, said latch mechanism includes interlocking members carried by said transparent panel and the roof, said interlocking members capable of locking said transparent panel in a tilted open position or in a fully closed position.

15. The system according to claim 14, wherein said latch mechanism comprises a latch handle connected to a substantially vertical latch shaft, and first and second latches extending radially from said latch shaft, and at least one groove carried by said roof, said groove for receiving a selected one of the latches depending on the selected open tilt angle of the transparent panel.

16. The system according to claim 15, wherein said latch mechanism further includes a latch hook member on a distal end of said shaft, said hook member configured to engage said visor.

17. The system according to claim 9, wherein said transparent panel and said visor are hinged to said roof on a common hinge axis, and said visor is sized to completely cover said transparent panel when said visor and said transparent panel are closed onto said roof to cover said opening.

18. The system according to claim 9, comprising:

a latch handle connected to a substantially vertical latch shaft, said vertical latch shaft rotatably mounted to said transparent panel, and first and second latches extending radially from said latch shaft; and at least one catch having a groove, said catch carried by said roof, said groove for receiving a selected one of the latches depending on the selected angle of the transparent panel.

19. The system according to claim 18, further comprising a latch hook member on a distal end of said shaft, said hook member configured to engage said visor.

20. The system according to claim 19, wherein said visor comprises a bracket, said bracket comprising a spring loaded element that can be engaged by said latch hook by contact force from said latch hook in a direction of approach of said latch hook toward said bracket, and said latch hook is disengagable from said spring loaded element by rotation of said latch shaft.

21. The system according to claim 20, wherein a first rotary range of positions of said latch shaft and a first vertical position of said latch shaft corresponds to said first latch being engaged into said groove, corresponding to a position wherein said transparent panel closes said opening, and a second rotary range of positions of said latch shaft and a second vertical position of said latch shaft corresponds to said second latch being engaged into said groove, corresponding to a position wherein said transparent panel is tilted open, and wherein a rotary position of said latch shaft that is outside said first and second ranges corresponds to disengagement of said hook member from said spring loaded element.

22. The system according to claim 19, wherein a first rotary range of positions of said latch shaft and a first vertical position of said latch shaft corresponds to said first latch being engaged into said groove, corresponding to a position wherein said transparent panel closes said opening, and a second rotary range of positions of said latch shaft and a second vertical position of said latch shaft corresponds to said second latch being engaged into said groove, corresponding to a position wherein said transparent panel is tilted open, and wherein a rotary position of said latch shaft that is outside said first and second ranges corresponds to disengagement of said hook member from said bracket.

23. The system according to claim 9, comprising:

a latch handle connected to a substantially vertical latch shaft said vertical latch shaft rotatably mounted to said transparent panel, and a latch hook member on a distal end of said shaft and said visor comprises a bracket, said hook member configured to engage said bracket.

24. The system according to claim 23, wherein said bracket comprises a spring loaded element that can be engaged by said latch hook by contact force from said latch hook in a direction of approach of said latch hook toward said bracket and said latch hook is disengagable from said spring loaded member by rotation of said latch shaft.

25. The system according to claim 23, wherein said bracket comprises a pivoting bar and a spring for loading said pivoting bar, and said latch hook comprises a rounded head above an engagement groove, said pivoting bar can be engaged by said latch hook by contact force from said rounded head in a direction of approach of said latch hook toward said bracket, that causes upward pivoting of said bar, and said spring is arranged to cause downward pivoting of said bar to engage into the engagement groove of said latch hook, and said latch hock is disengagable from said pivoting bar by rotation of said latch shaft.

26. The system according to claim 9, further comprising a latch mechanism rotatably carried on said transparent panel and configured to selectively latch said visor to said transparent panel, wherein said visor comprises a bracket and said latch mechanism includes a latch handle operatively connected to a latch hook member, said hook member configured to engage said bracket in a direction of approach of said transparent panel to said visor and to be disengaged by rotation of said latch handle.

27. The system according to claim 9, wherein both said transparent panel and said visor are hinged to said roof rearward of said window opening.

28. The system according to claim 27, further comprising lights carried by said visor and operable to cast a light beam at the open position of said visor.

29. The system according to claim 21, wherein said first rotary range of positions and said second rotary range of positions are the same.

30. The system according to claim 22, wherein said first rotary range of positions and said second rotary range of positions are the same.

* * * * *